(12) United States Patent
Wu et al.

(10) Patent No.: US 10,029,314 B1
(45) Date of Patent: Jul. 24, 2018

(54) AUTOMATIC WHEEL RIM POSITIONING AND CLAMPING TOOL

(71) Applicant: YEONG CHIN MACHINERY INDUSTRIES CO., LTD., Taichung (TW)

(72) Inventors: Mao-Pin Wu, Taichung (TW); Tung-Chuan Chang, Taichung (TW); Tzu-Kun Yang, Kaohsiung (TW); Pin-Rou Tseng, Taichung (TW)

(73) Assignee: YEONG CHIN MACHINERY INDUSTRIES CO., LTD., Taichung (TW)

( * ) Notice: Subject to any disclaimer, the term of this patent is extended or adjusted under 35 U.S.C. 154(b) by 58 days.

(21) Appl. No.: 15/415,199

(22) Filed: Jan. 25, 2017

(51) Int. Cl.
B23B 31/16 (2006.01)
B23B 31/18 (2006.01)
B23B 31/30 (2006.01)

(52) U.S. Cl.
CPC ........ *B23B 31/18* (2013.01); *B23B 31/16287* (2013.01); *B23B 31/302* (2013.01); *B23B 2215/08* (2013.01); *B23B 2231/24* (2013.01); *B23B 2231/26* (2013.01); *B23B 2260/128* (2013.01); *B23B 2270/28* (2013.01); *B23B 2270/30* (2013.01); *Y10T 279/1033* (2015.01); *Y10T 279/12* (2015.01); *Y10T 279/1291* (2015.01); *Y10T 279/18* (2015.01); *Y10T 279/19* (2015.01); *Y10T 279/29* (2015.01)

(58) Field of Classification Search
CPC . B23B 31/16287; B23B 31/18; B23B 31/302; B23B 2215/08; B23B 2231/24; B23B 2231/26; B23B 2260/128; Y10T 279/1033; Y10T 279/12; Y10T 279/1291; Y10T 279/18; Y10T 279/19; Y10T 279/29
See application file for complete search history.

(56) References Cited

U.S. PATENT DOCUMENTS

| | | | | |
|---|---|---|---|---|
| 4,139,207 | A * | 2/1979 | Grimes | B23B 31/30 279/127 |
| 4,318,293 | A * | 3/1982 | Heymanns Lothar | B23B 31/16241 279/123 |
| 5,464,233 | A * | 11/1995 | Hanai | B23B 31/16229 279/106 |
| 5,503,508 | A * | 4/1996 | Amiguet | B23B 31/4006 269/24 |

(Continued)

*Primary Examiner* — Eric A Gates
(74) *Attorney, Agent, or Firm* — Pai Patent & Trademark Law Firm; Chao-Chang David Pai

(57) ABSTRACT

An automatic positioning and clamping tool for mounting in a CNC Tilting Rotary Table for positioning and clamping a wheel rim for processing by a cutting tool includes a base, an upright post mounted at the base, air leakage detection units mounted on the base for supporting the wheel rim and detecting an air leakage, clamping devices mounted on the base for clamping the border edge of the wheel rim, a lateral chip conveyor, nozzles mounted around the periphery of the lateral chip conveyor, a vertical hydraulic chuck mounted around the upright post for moving a positioning gripper into abutment against the bore wall of the center bore of the wheel rim, and fluid nozzles mounted in the vertical hydraulic chuck for flushing away chips during processing. Thus, the invention is a compact structure with functions of air leakage detection, wheel rim automatic positioning and clamping and chip removal.

9 Claims, 6 Drawing Sheets

(56) References Cited

U.S. PATENT DOCUMENTS

| | | | | |
|---|---|---|---|---|
| 5,562,007 | A * | 10/1996 | Seymour | B23B 31/185 |
| | | | | 279/106 |
| 5,848,795 | A * | 12/1998 | Masatsugu | B23B 31/1261 |
| | | | | 279/137 |
| 6,126,174 | A * | 10/2000 | Reece | B23B 31/185 |
| | | | | 279/106 |
| 6,502,834 | B1 * | 1/2003 | Fukui | B23B 31/201 |
| | | | | 279/156 |
| 7,415,766 | B2 * | 8/2008 | Luschei | B23B 1/00 |
| | | | | 279/133 |
| 8,172,489 | B2 * | 5/2012 | Prust | B23B 31/16275 |
| | | | | 269/134 |
| 9,248,515 | B2 * | 2/2016 | Chou | B23B 31/185 |
| 9,346,106 | B2 * | 5/2016 | Ku | B23B 31/42 |
| 2012/0319364 | A1 * | 12/2012 | Oki | B23B 31/16287 |
| | | | | 279/2.06 |

* cited by examiner

AUTOMATIC WHEEL RIM POSITIONING AND CLAMPING TOOL

BACKGROUND OF THE INVENTION

(a) Field of the Invention

The present invention relates to automobile technology and more particularly to an automatic wheel rim positioning and clamping apparatus for installation in a CNC Tilting Rotary Table to secure a wheel rim for processing. Such positioning and clamping apparatus has the functions of air leakage detection, wheel rim automatic positioning and clamping and automatic chip removal.

(b) Description of the Prior Art

Regular automobile wheel rims or truck wheel rims must be processed with a cutting tool to form the desired wheel hub and spokes. Nowadays, Computer Numerical Control ("CNC") machine tools are commonly used for processing wheel rims in automated production. However, the clamping fixtures used in CNC machine tools for securing a wheel rim for processing still adopt a manual placement design. These clamping fixtures cannot be used with a robotic arm to achieve fully automated production. There are advanced designs of clamping fixtures that can be installed in a CNC machine tool for cutting a wheel rim, however, these advanced designs of clamping fixtures are quite complex in structure, resulting in a relatively higher production cost. Further, these advanced designs of clamping fixtures cannot perform other functions, such as automatic removal of cutting chips during the cutting process, thus affecting the feasibility of fully automated processing.

SUMMARY OF THE INVENTION

The present invention has been accomplished under the circumstances in view. It is main object of the present invention to provide an automatic wheel rim positioning and clamping tool which employs an air leakage detection technique to rapidly detect the wheel rim position and clamping status.

It is another object of the present invention to provide an automatic wheel rim positioning and clamping tool which employs a vertical hydraulic chuck positioning technique and has multiple clamping devices arranged around the wheel rim to be processed, allowing automatic wheel rim positioning and clamping to implement a robotic arm and a CNC machine tool for automated production.

It is still another object of the present invention to provide an automatic wheel rim positioning and clamping tool which employs a fluid flushing technique to flush away chips during processing so as to prevent the chips from interfering with the processing operation.

It is still another object of the present invention to provide an automatic wheel rim positioning and clamping tool which has the characteristics of compact structure and low tool cost.

To achieve these and other objects of the present invention, an automatic wheel rim positioning and clamping tool comprises a base, which comprises a bottom wall for mounting, a top bearing wall opposite to the bottom wall, a center portion in communication between the bottom wall and the top bearing wall, an upright post mounted on the top bearing wall of the base above the center portion, a lateral chip conveyor, which comprises an annular fluid nozzle holder fixedly mounted on the top bearing wall of the base around the upright post for guiding in a fluid for flushing away chips and a plurality of first lateral nozzles mounted on the periphery of the annular fluid nozzle holder for spraying out the fluid being guided into the annular fluid nozzle holder, a vertical hydraulic chuck, which is concentrically mounted on the upright post and affixed to the annular fluid nozzle holder, comprising a plurality of claw blocks equiangularly arranged on a top surface thereof and horizontally radially movable toward or away from the upright post, a positioning gripper, which comprises a plurality of gripper blocks respectively fixedly mounted on the claw blocks, each gripper block having a friction surface located on one lateral side thereof and adapted for abutting against a bore wall of a center bore of the wheel rim to be processed, a plurality of air leakage detection units, which are mounted on the top bearing wall of the base, each comprising a contact surface or abutment against the wheel rim to be processed, a gas flow sensor mounted therein and a first air hole having one end thereof extended to the contact surface and an opposite end thereof connected to the gas flow sensor, and a plurality of clamping devices mounted on the top bearing wall of the base and spaced around the lateral chip conveyor and adapted for clamping the wheel rim to be processed.

Other advantages and features of the present invention will be fully understood by reference to the following specification in conjunction with the accompanying drawings, in which like reference signs denote like components of the structure.

DETAILED DESCRIPTION OF THE PREFERRED EMBODIMENTS

Figure 1:
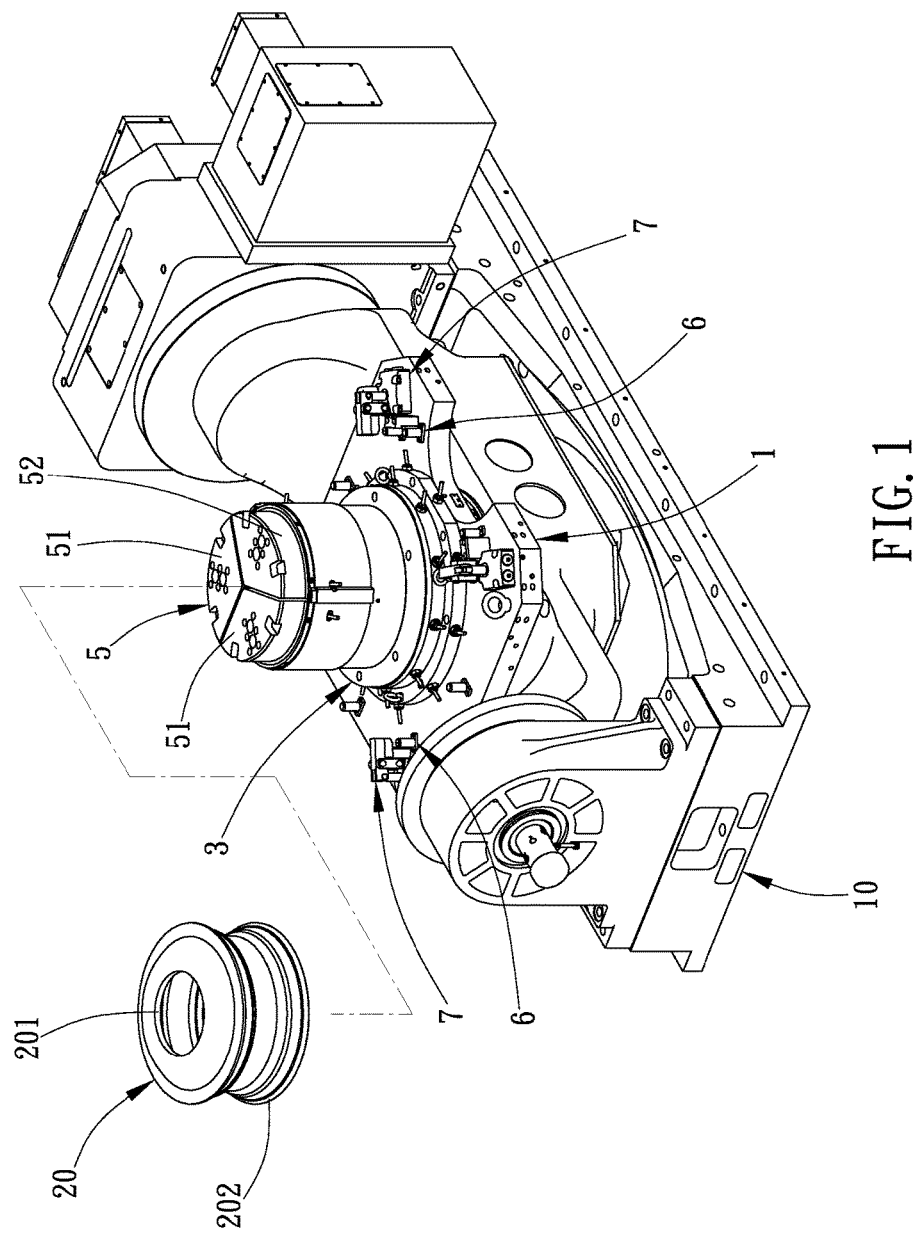
FIG. 1 is a schematic drawing illustrating an automatic positioning and clamping tool in accordance with the present invention, as installed in a CNC Tilting Rotary Table.
Figure 7:
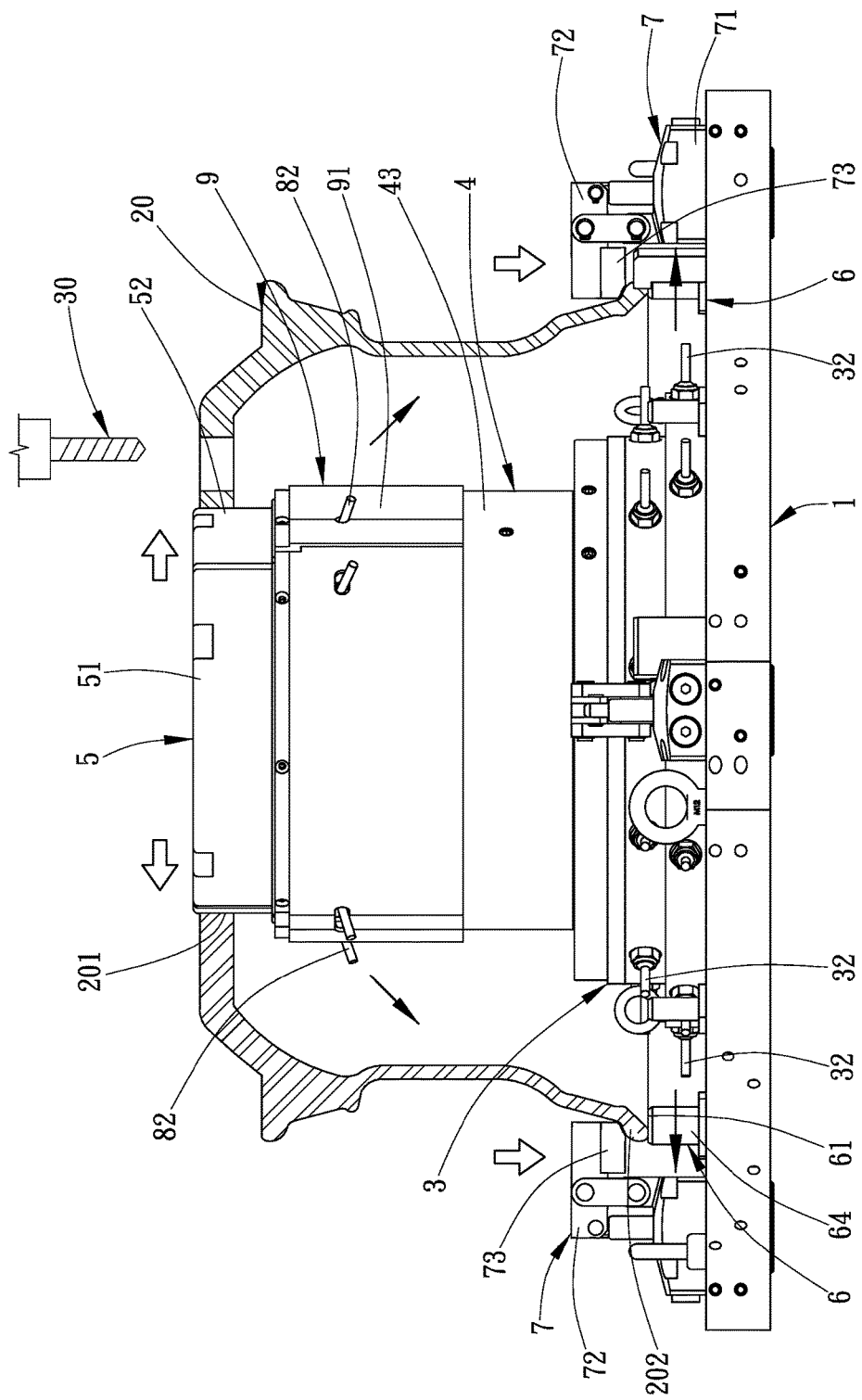
FIG. 7 is a schematic drawing illustrating the automatic positioning and clamping tool holding a wheel rim for processing.

Referring to FIG. 1 and FIG. 7, an automatic positioning and clamping tool for wheel rim processing in accordance with the present invention is shown. The automatic positioning and clamping tool is adapted for mounting in a CNC Tilting Rotary Table 10 for positioning and clamping a wheel rim 20, so that a cutting tool 30 of a CNC machine tool can be operated to process the wheel rim 20. The wheel rim 20 is typically a truck wheel rim of 20 inches or more in diameter, but is not limited to a truck wheel rim.

Figure 2:
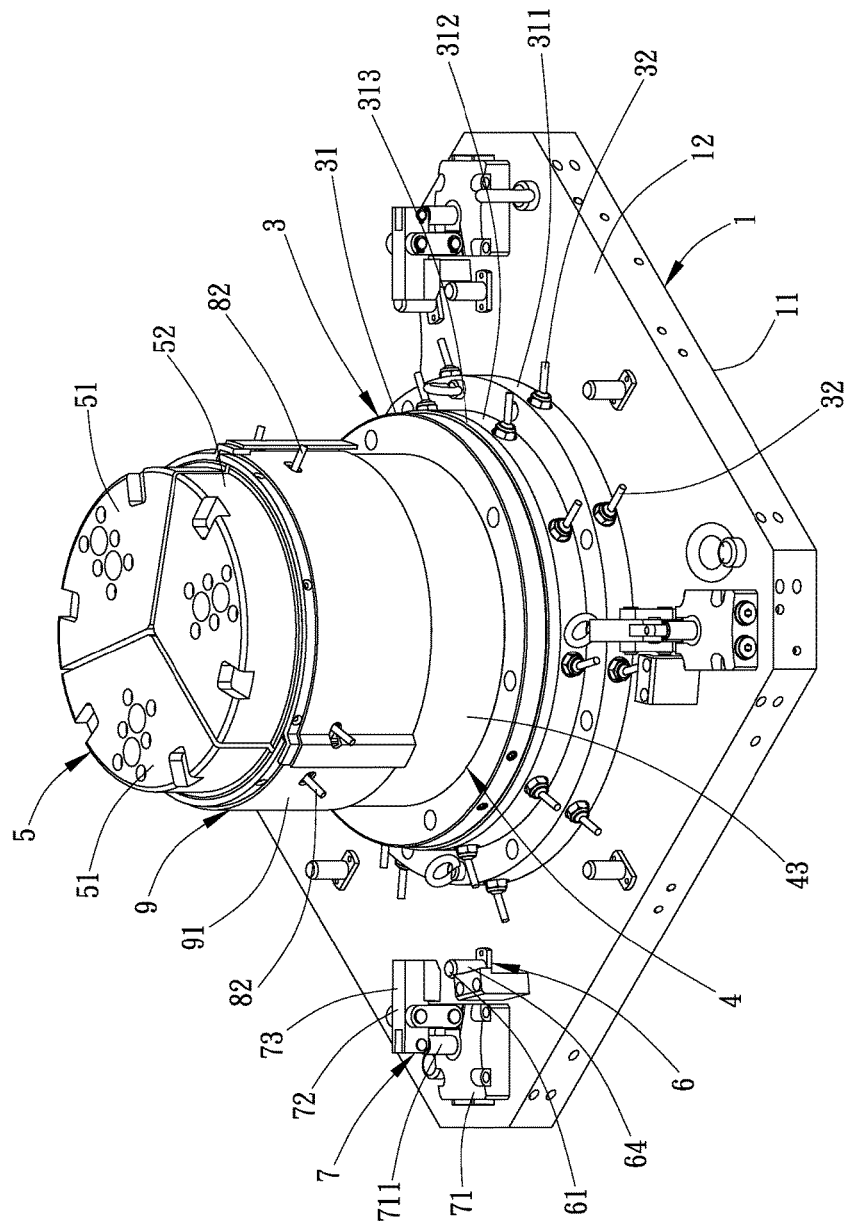
FIG. 2 is an oblique top view of the automatic positioning and clamping tool in accordance with the present invention.
Figure 3:
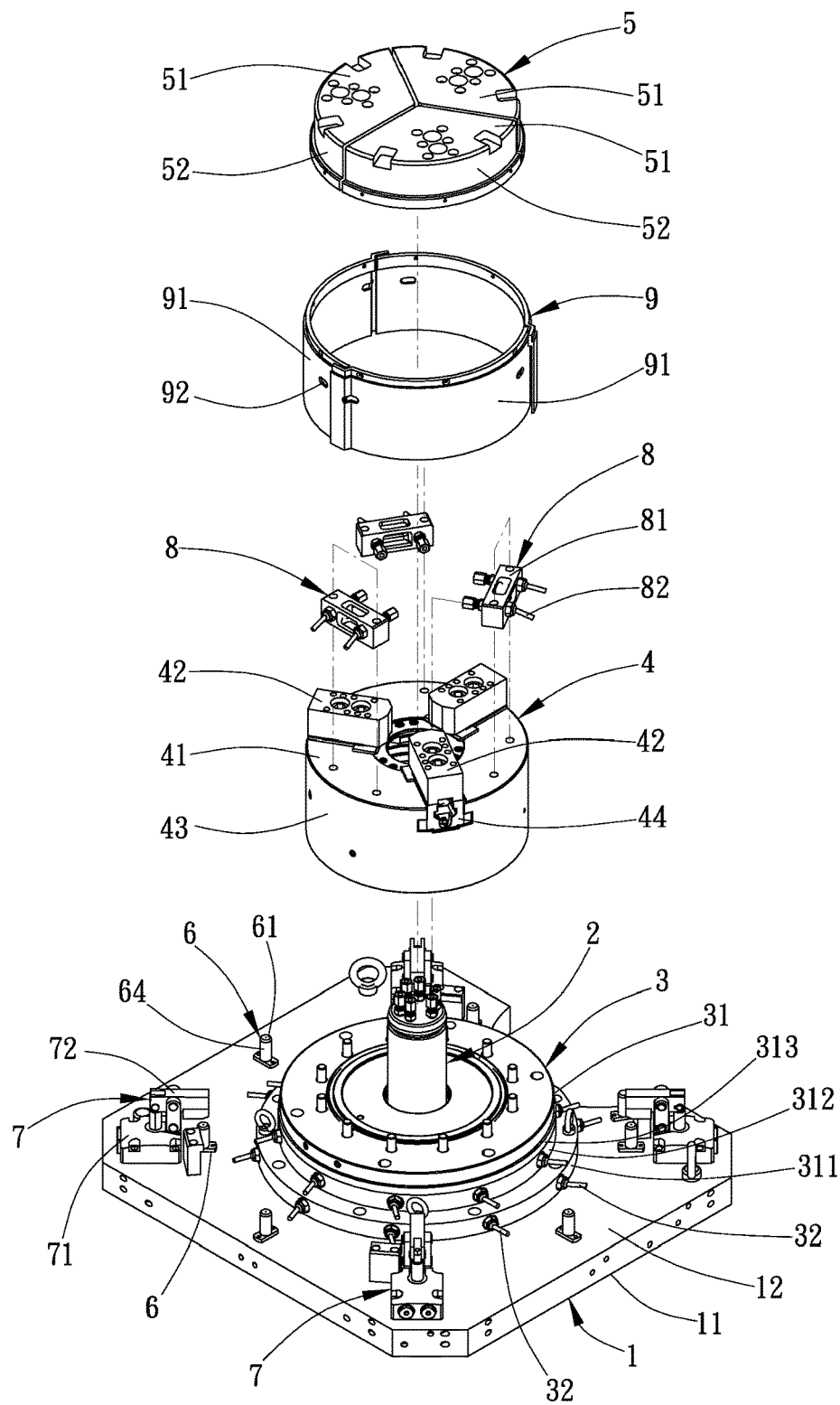
FIG. 3 is an exploded view of the automatic positioning and clamping tool in accordance with the present invention.
Figure 5:
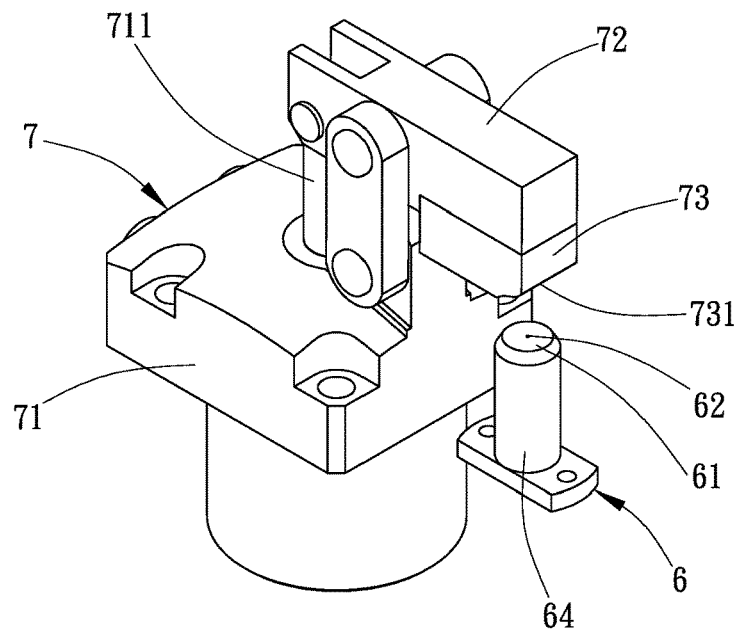
FIG. 5 is a perspective view of one air leakage detection unit and one clamping device.

Referring to FIG. 2, FIG. 3 and FIG. 5, the automatic positioning and clamping tool comprises a base 1, an upright post 2, a lateral chip conveyor 3, a vertical hydraulic chuck 4, a positioning gripper 5, a plurality of air leakage detection unit 6, and a plurality of clamping devices 7. The base 1 comprises a bottom wall 11 for mounting on the CNC Tilting Rotary Table 10, a top bearing wall 12 opposite to the bottom wall 11, and a center portion 13 in communication between the bottom wall 11 and the top bearing wall 12. Preferably, the base 1 is a flat plate member. The upright post 2 is mounted on the top bearing wall 12 of the base 1 above the center portion 13. Further, the upright post 2 can be a stepped column with a circular or polygonal cross section. The lateral chip conveyor 3 comprises an annular fluid nozzle holder 31 fixedly mounted on the top bearing wall 12 of the base 1 around the upright post 2 for guiding in a fluid that is a working fluid for flushing away chips, and a plurality of first lateral nozzles 32 mounted on the periphery of the annular fluid nozzle holder 31. Preferably, the first lateral nozzles 32 are adjustable spherical universal nozzles. The vertical hydraulic chuck 4 is concentrically mounted on the upright post 2 and affixed to the annular fluid nozzle holder 31, comprising a plurality of claw blocks 42 equiangularly arranged on a top surface 41 thereof and horizontally radially movable by a hydraulic drive to move toward or away from the upright post 2. The positioning gripper 5 is adapted for contacting and allocating the wheel rim 20, comprising a plurality of gripper blocks 51 respectively fixedly mounted on the claw blocks 42. Each gripper block 51 has a friction surface 52 located on one lateral side thereof and adapted for abutting against a bore wall of a center bore 201 of the wheel rim 20. Thus, by means of moving the claw blocks 42 of the vertical hydraulic chuck 4 to carry the respective gripper blocks 51 horizontally, the friction surfaces 52 of the gripper blocks 51 can be forced into abutment against the bore wall of the center bore 201 of the wheel rim 20 to allocate the wheel rim 20. The air leakage detection units 6 are mounted on the top bearing wall 12 of the base 1. Each air leakage detection unit 6 comprises a contact surface 61 for abutment against the wheel rim 20, a gas flow sensor 63 mounted therein, and a first air hole 62 defined therein and having one end thereof extended to the contact surface 61 and an opposite end thereof connected to the gas flow sensor 63. The clamping devices 7 are mounted on the top bearing wall 12 and spaced around the lateral chip conveyor 3, and adapted for clamping a flange 202 of the wheel rim 20.

Figure 4:
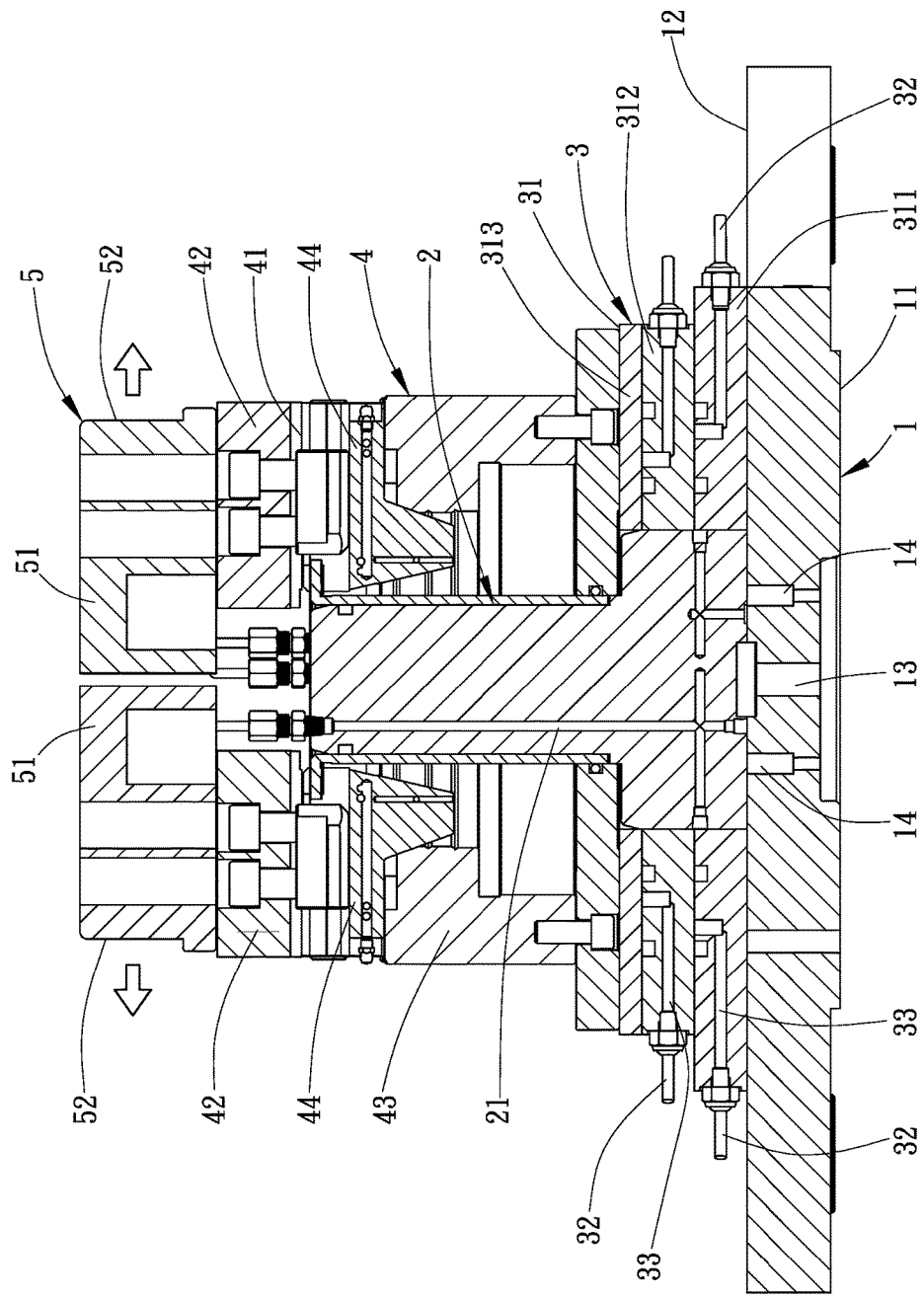
FIG. 4 is a side sectional view of the automatic positioning and clamping tool in accordance with the present invention.

Referring to FIG. 4 and FIG. 3 again, automatic positioning and clamping tool according to the invention further comprises a plurality of top chip conveyors 8. Each top chip conveyor 8 comprises a top fluid nozzle holder 81 mounted on the top surface 41 of the vertical hydraulic chuck 4 for guiding in a fluid, and at least one second lateral nozzle 82 mounted on one lateral side of the top fluid nozzle holder 81 for spraying the intake flow of a working fluid. The second lateral nozzle 82 can be an adjustable spherical universal nozzle. Further, an annular shielding shell 9 is provided to surround the vertical hydraulic chuck 4. The annular shielding shell 9 comprises a plurality of arched shell elements 91 tightly connected to one another, and a plurality of mounting holes 92 located on the arched shell elements 91 for accommodating the second lateral nozzles 82 of the top chip conveyors 8, enabling the second lateral nozzles 82 to extend out of the annular shielding shell 9 for spraying a working fluid to flush away chips.

Referring to FIG. 4 again, the automatic positioning and clamping tool according to the invention uses the aforesaid first lateral nozzles 32 and second lateral nozzles 82 to spray a working fluid for flushing away chips and dust. The working fluid supplying structure is a hidden structure, comprising a plurality of first working fluid supply channel 14 located in the center portion 13 of the base 1 in communication between the bottom wall 11 and the top bearing wall 12, a plurality of second working fluid supply channels 21 located in the upright post 2 in communication between one lateral wall and a top surface thereof for communication with the first working fluid supply channel 14 as well as for communication with the top fluid nozzle holder 81 of the top chip conveyor 8 and the annular fluid nozzle holder 31 of the lateral chip conveyor 3, and a plurality of third working fluid supply channels 33 located in the annular fluid nozzle holder 3 with respective one ends thereof extended to the periphery thereof and respective opposite ends thereof disposed in communication with the first working fluid supply channels 14 or the second working fluid supply channels 21. The first lateral nozzle 32 are mounted on the periphery of the annular fluid nozzle holder 31 within the respective other ends of the third working fluid supply channels 33. In order to facilitate the implementation of the third working fluid supply channel 33, the annular fluid nozzle holder 31 of the lateral chip conveyor 3 is configured to comprise a lower ring-shaped body 311, an upper ring-shaped body 312 mounted at a top side of the lower ring-shaped body 311, and a top ring-shaped cap 313 attached to a top side of the upper ring-shaped body 312. The lower ring-shaped body 311 and the upper ring-shaped body 312 are configured to provide the aforesaid third working fluid supply channels 33. The first lateral nozzles 32 are respectively mounted in the periphery of the lower ring-shaped body 311 and the periphery of the upper ring-shaped body 312.

Referring to FIGS. 3 and 4 again, the aforesaid vertical hydraulic chuck 4 comprises a chuck body 43 mounted on the upright post 2 and the annular fluid nozzle holder 31, three sliders 44 equiangularly and slidably mounted on the chuck body 43 and drivable by a hydraulic drive (not shown) to move horizontally and radially toward the upright post 2 or away from the upright post 2, and the aforesaid claw blocks 42 respectively fixedly mounted on the sliders 44. The aforesaid positioning gripper 5 preferably comprises three said gripper blocks 51. These three gripper blocks 51 are 120-degree sector blocks. Thus, when the gripper blocks 51 are abutted against one another, the friction surfaces 52 of the gripper blocks 51 constitute a circular surface for butting against the bore wall of the center bore 201 of the wheel rim 20.

Figure 6:
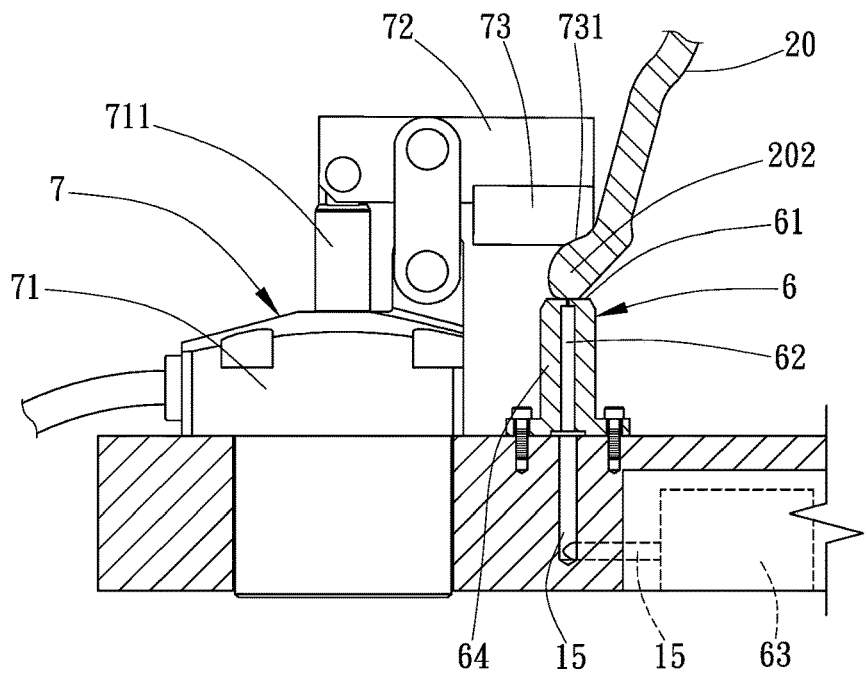
FIG. 6 is a schematic drawing illustrating an operation status of the air leakage detection unit and the clamping device.

Referring to FIG. 6 and FIG. 5 again, each air leakage detection unit 6 preferably comprises a support column 64. The aforesaid contact surface 61 is located on a top end of the support column 64 for supporting the flange 202 of the wheel rim 20. The aforesaid first air hole 62 is defined in the support column 64 and extended to an opposing bottom end of the support column 64. The base 1 has a plurality of second air holes 15 defined therein and respectively disposed in communication with the first air holes 62 in the support columns 64 of the air leakage detection units 6. Further, the second air holes 15 are respectively extended to the gas flow sensors 63 of the air leakage detection units 6 in the base 1. Thus, when the wheel rim 20 is placed on the contact surfaces 61 of the support columns 64 of the air leakage detection units 6, the clamping devices 7 and the positioning gripper 5 at the vertical hydraulic chuck 4 are driven to secure the wheel rim 20 in position, the gas flow sensors 63 are controlled to supply a gas to the second air holes 15 and the first air holes 62. At this time, if the border edge of the wheel rim 20 is accurately abutted against the contact surfaces 61 of the support column 64 of the air leakage detection units 6 in an airtight manner, the applied gas is prohibited from leaking out of the first air holes 62. On the contrary, if the border edge of the wheel rim 20 is not accurately abutted against the contact surfaces 61 of the support column 64 of the air leakage detection units 6 in an airtight manner, the applied gas will leak out and will be detected by the gas flow sensors 63, and the gas flow sensors 63 will then provide a signal to an alarm (not shown), avoiding damage to the processing machine due to processing size errors or inaccurate clamping.

Referring to FIGS. 5 and 6 again, the aforesaid clamping devices 7 preferably each comprise an actuating cylinder 71 that can be a hydraulic cylinder or pneumatic cylinder having a piston rod 711, a lever 72 having one end thereof pivotally connected to the piston rod 711 of the actuating cylinder 71, and a clamping block 73 connected to an opposite end of the lever 72 and adapted for clamping on the flange 202 of the wheel rim 20. The clamping block 73 has a clamping surface 731 facing toward the contact surface 61 of one respective air leakage detection unit 6.

When using the automatic positioning and clamping tool to secure a wheel rim 20 for processing, as illustrated in FIG. 7, the procedure comprises the steps of: (a) operate a robotic arm (not shown) to pick up the wheel rim 20 to be processed and then to attach the center bore 201 of the wheel rim 20 onto the positioning gripper 5; (b) control the vertical hydraulic chuck 4 to carry the gripper blocks 51 radially outwards and to force the friction surfaces 52 of the gripper blocks 51 into abutment against the bore wall of the center bore 201 of the wheel rim 20; (c) release the robotic arm from the wheel rim 20 and move the robotic arm out of the CNC machine tool; (d) control the vertical hydraulic chuck 4 to carry the gripper blocks 51 radially inwards toward the upright post 2 and then radially outwards, enabling the border edge of the wheel rim 20 to accurately abut against the contact surfaces 61 of the air leakage detection units 6; (e) operate the clamping devices 7 to drive the actuating cylinders 71 in moving the respective levers 72, causing the respective levers 72 to force the respective clamping blocks 73 downwardly onto the flange 202 of the wheel rim 20; (f) measure the size of the wheel rim 20, and then control the air leakage detection units 6 to supply a gas to the first air holes 62 so as to detect whether or not the border edge of the wheel rim 20 has been smoothly and accurately abutted against the contact surfaces 61 of the support columns 64. If a gas leakage is detected at this time, return to step (d). On the contrary, if no gas leakage is detected, start operating the cutting tool 30 of the CNC machine tool to process the wheel rim 20.

Further, as illustrated in FIG. 7, when operating the cutting tool 30 to process the wheel rim 20, keep spraying the working fluid through the first lateral nozzles 32 and the second lateral nozzles 82 to flush chips away from the wheel rim 20 onto the base 1. Since the wheel rim 20 is raised by the support columns 64, chips can be washed away from the gap between the wheel rim 20 and the base 1, preventing the chips from interfering with the processing operation.

What is claimed is:

1. An automatic wheel rim positioning and clamping tool adapted for positioning and clamping a wheel rim for enabling a cutting tool to be operated to process said wheel rim, the automatic wheel rim positioning and clamping tool comprising: a base comprising a bottom wall for mounting, a top bearing wall opposite to said bottom wall, a center portion in communication between said bottom wall and said top bearing wall; an upright post mounted on said top bearing wall of said base above said center portion; a lateral chip conveyor comprising an annular fluid nozzle holder fixedly mounted on said top bearing wall of said base around said upright post for guiding in a fluid for flushing away chips, and a plurality of first lateral nozzles mounted on the periphery of said annular fluid nozzle holder for spraying out the fluid guided into said annular fluid nozzle holder; a vertical hydraulic chuck concentrically mounted on said upright post and affixed to said annular fluid nozzle holder, said vertical hydraulic chuck comprising a plurality of claw blocks equiangularly arranged on a top surface thereof and horizontally radially movable toward or away from said upright post; a positioning gripper comprising a plurality of gripper blocks respectively fixedly mounted on said claw blocks, each said gripper block having a friction surface located on one lateral side thereof and adapted for abutting against a bore wall of a center bore of the wheel rim to be processed; a plurality of air leakage detection units mounted on said top bearing wall of said base, each said air leakage detection unit comprising a contact surface for abutment against the wheel rim to be processed, a gas flow sensor mounted therein and a first air hole defined therein, said first air hole having one end thereof extended to said contact surface and an opposite end thereof connected to said gas flow sensor; and a plurality of clamping devices mounted on said top bearing wall of said base and spaced around said lateral chip conveyor and adapted for clamping the wheel rim to be processed.

2. The automatic wheel rim positioning and clamping tool as claimed in claim 1, further comprising a plurality of top chip conveyors, each said top chip conveyor comprising a top fluid nozzle holder mounted on said top surface of said vertical hydraulic chuck for guiding in a fluid, and at least one second lateral nozzle mounted on one lateral side of said fluid nozzle holder for spraying the fluid guided into said top fluid nozzle holder.

3. The automatic wheel rim positioning and clamping tool as claimed in claim 2, further comprising an annular shielding shell surrounding said vertical hydraulic chuck, wherein each said second lateral nozzle extends from an inner side of said annular shielding shell to an outer side of said annular shielding shell.

4. The automatic wheel rim positioning and clamping tool as claimed in claim 2, wherein said base further comprises a plurality of first working fluid supply channels defined in said center portion in communication between said bottom wall and said top bearing wall; said upright post comprises a plurality of second working fluid supply channels defined therein and extended between one lateral side and a top surface thereof, said second working fluid supply channels being disposed in communication with said first working fluid supply channels and said top fluid nozzle holder of said top chip conveyor and said annular fluid nozzle holder of said lateral chip conveyor; said annular fluid nozzle holder comprises a plurality of third working fluid supply channels defined therein and extended to the periphery thereof, said third working fluid supply channels being disposed in communication with said first working fluid supply channels and said second working fluid supply channels; and said first lateral nozzles are mounted in the periphery of said annular fluid nozzle holder within respective outer ends of said third working fluid supply channels.

5. The automatic wheel rim positioning and clamping tool as claimed in claim 4, wherein said annular fluid nozzle holder comprises a lower ring-shaped body, an upper ring-shaped body mounted on a top side of said lower ring-shaped body and a top ring-shaped cap attached to a top side of said upper ring-shaped body; said third working fluid supply channels are mounted in said lower ring-shaped body and said upper ring-shaped body of said annular fluid nozzle holder; and said first lateral nozzles are mounted in the periphery of said lower ring-shaped body and the periphery of said upper ring-shaped body.

6. The automatic wheel rim positioning and clamping tool as claimed in claim 1, wherein said vertical hydraulic chuck comprises a chuck body mounted on said upright post and said annular fluid nozzle holder, three sliders equiangularly and slidably mounted on said chuck body and drivable by an external hydraulic drive to move horizontally and radially toward said upright post or away from said upright post, and three said claw blocks respectively fixedly mounted on said sliders; said positioning gripper comprises three said gripper blocks, said three gripper blocks being so configured that when said three gripper blocks are abutted against one another, the said friction surfaces of said three gripper blocks constitute a circular surface for butting against the bore wall of the center bore of the wheel rim to be processed.

7. The automatic wheel rim positioning and clamping tool as claimed in claim 1, wherein each said air leakage detection unit comprises a support column, said support column having a top end surface thereof forming the said contact surface of the respective said air leakage detection unit, said support column having the respective said first air hole defined therein; and said base comprises a plurality of second air holes respectively disposed in communication with the said first air holes of said air leakage detection units and the said gas flow sensors of said air leakage detection units.

8. The automatic wheel rim positioning and clamping tool as claimed in claim 1, wherein each said clamping device comprises an actuating cylinder having a piston rod, a lever having one end thereof pivotally connected to said piston rod of said actuating cylinder, and a clamping block located at an opposite end of said lever and adapted for pressing on the wheel rim to be processed, said clamping block comprising a clamping surface facing toward the said contact surface of one respective said air leakage detection unit.

9. The automatic wheel rim positioning and clamping tool as claimed in claim 8, wherein said actuating cylinder is selectively a hydraulic cylinder or pneumatic cylinder.

* * * * *